United States Patent [19]

Cobb et al.

[11] 4,237,984
[45] Dec. 9, 1980

[54] ROTATING FIELD PLOT ROW MARKER

[75] Inventors: David L. Cobb; Brian L. Doyle, both of Lansing; James A. Webster, Okemos; David H. Smith, Jr., East Lansing, all of Mich.

[73] Assignee: The United States of America as represented by the Secretary of Agriculture, Washington, D.C.

[21] Appl. No.: 43,976

[22] Filed: May 30, 1979

[51] Int. Cl.³ ............................................. A01B 29/06
[52] U.S. Cl. ................................... 172/554; 404/124
[58] Field of Search ............... 172/554, 555, 69, 537, 172/539, 126, 130, 552, 553; 404/124; 111/87, 33

[56] References Cited

U.S. PATENT DOCUMENTS

| 107,074 | 9/1870 | McConaughy . | |
|---|---|---|---|
| 348,284 | 8/1886 | Horton . | |
| 419,892 | 1/1890 | Schumacher . | |
| 461,133 | 10/1891 | Smith | 172/69 |
| 907,721 | 12/1908 | Boak | 111/33 X |
| 1,384,546 | 7/1921 | White | 404/124 X |
| 1,560,295 | 11/1925 | Keeler | 404/124 |
| 2,146,222 | 2/1939 | Pace . | |
| 2,228,265 | 1/1941 | Garey . | |
| 3,463,063 | 8/1969 | Caron et al. . | |
| 3,710,871 | 1/1973 | Hill . | |
| 3,832,079 | 8/1974 | Moorhead . | |
| 4,020,906 | 5/1977 | Wells | 172/539 X |
| 4,105,354 | 8/1978 | Bowman | 404/124 X |

Primary Examiner—Paul E. Shapiro
Attorney, Agent, or Firm—M. Howard Silverstein; David G. McConnell; Curtis P. Ribando

[57] ABSTRACT

A rotating row marker equipped with both transverse and longitudinal imprinting projections impresses a grid-type pattern into the soil for precise placement of seeds or seedlings in a subsequent planting operation. One of the transverse projections houses an eccentric weight for gravitationally returning the row marker to a predetermined position when the row marker is raised above the earth.

7 Claims, 4 Drawing Figures

ROTATING FIELD PLOT ROW MARKER

BACKGROUND OF THE INVENTION

1. Field of the Invention

This invention relates to an agricultural row marking apparatus of the type that makes impressions in the earth to assist in the placement of seeds or seedlings during planting.

2. Description of the Prior Art

Row markers, furrowing tools, and earth impressors in general are well known in the art. One of the more conventional types of row indicators is a spring tooth marker comprising one or more vertically mounted metal tines, each of which etches a linear furrow when pulled through the field. A combination garden marker and furrow opener is disclosed by L. H. Wells in U.S. Pat. No. 4,020,906. This device comprises an enclosed water-fillable drum which is rotatably mounted to a yoke and handle. A V-shaped projecting flange fastened to the outer cylindrical drum wall impresses a planting groove in the soil parallel to the direction of travel.

In U.S. Pat. No. 2,146,222, Pace teaches a cotton seed planter opener comprising a ground wheel having a flange around its outer edge to produce a seed furrow of longitudinally continuous wavelike form. A similar device is taught in U.S. Pat. No. 107,074 to McConaughy, wherein a cylindrical field roller is fitted with flanged rims or toothed rings for cutting a plurality of parallel seed furrows in the ground. Another rotary furrowing tool is shown by Hill in U.S. Pat. No. 3,710,871. It differs from that of McConaughy in that it cuts a single continuous seed furrow by rotating a cylindrical rim equipped with alternating cutting blades and dig-out teeth at a circumferential velocity greater than the linear velocity of the drive frame.

U.S. Pat. No. 419,892 granted to Schumacher and U.S. Pat. No. 2,228,265 to Garey show variations in cylindrical land rollers fitted with triangular projections for packing depressions or basins into the soil to collect water and prevent erosion.

While the above-mentioned devices are suitably designed for their disclosed functions, none can advantageously be used for simultaneously marking precisely spaced seed rows perpendicular to the direction of travel, and row divider marks parallel to the direction of travel and perpendicular to the seed rows. In laying out test plots and nurseries, it is frequently desired that the seed rows be equidistantly spaced and that these seed rows are divided into two or three short sections. The seed from a particular cultivar or experimental cross can be planted in each section. A method of accomplishing this with one of the existing monodirectional markers is to make a first pass in the direction desired for the seed rows. Then the marker is lifted from the soil or removed from the tractor and a second pass is made in a direction perpendicular to the first, by driving the tractor wheel-on-wheel track. The area between the wheel tracks or imprints is commonly designated as a "range". Imprints parallel to the direction of travel and dividing the seed rows into two or three sections within the range can be made by a separate marking tool if so desired on the second pass. Disadvantages of this technique are that it is time consuming for the operator and delays the work of the planting crew until the second pass is complete.

SUMMARY OF THE INVENTION

We have now devised a row marker which will simultaneously make impressions in the earth both parallel to and perpendicular to the direction of travel thereby forming a grid-type pattern.

In accordance with this invention, it is an object that the grid-forming apparatus be freely rolling with positive traction to the extent that the soil impressions made thereby are easily discernible and accurately spaced a predetermined distance from one another.

Another object of the invention is for the design of the row marker to lend itself to construction from readily available and relatively inexpensive materials.

A further object of the invention is that the row marker be adaptable for mounting on a conventional three-point tractor hitch and be easily maneuverable when positioning it for operation.

Other objects and advantages of this invention will become readily apparent from the ensuing description.

BRIEF DESCRIPTION OF THE DRAWINGS

FIG. 1 is a perspective drawing of the row marker and hitch assembly.

FIG. 2 is a top view of the row marker and hitch assembly.

FIG. 3 is a side elevation view of the row marker and hitch assembly.

FIG. 4 is a perspective view of an agricultural test plot marked by a single pass of the instant row marker.

DETAILED DESCRIPTION OF THE INVENTION

Figure 1:
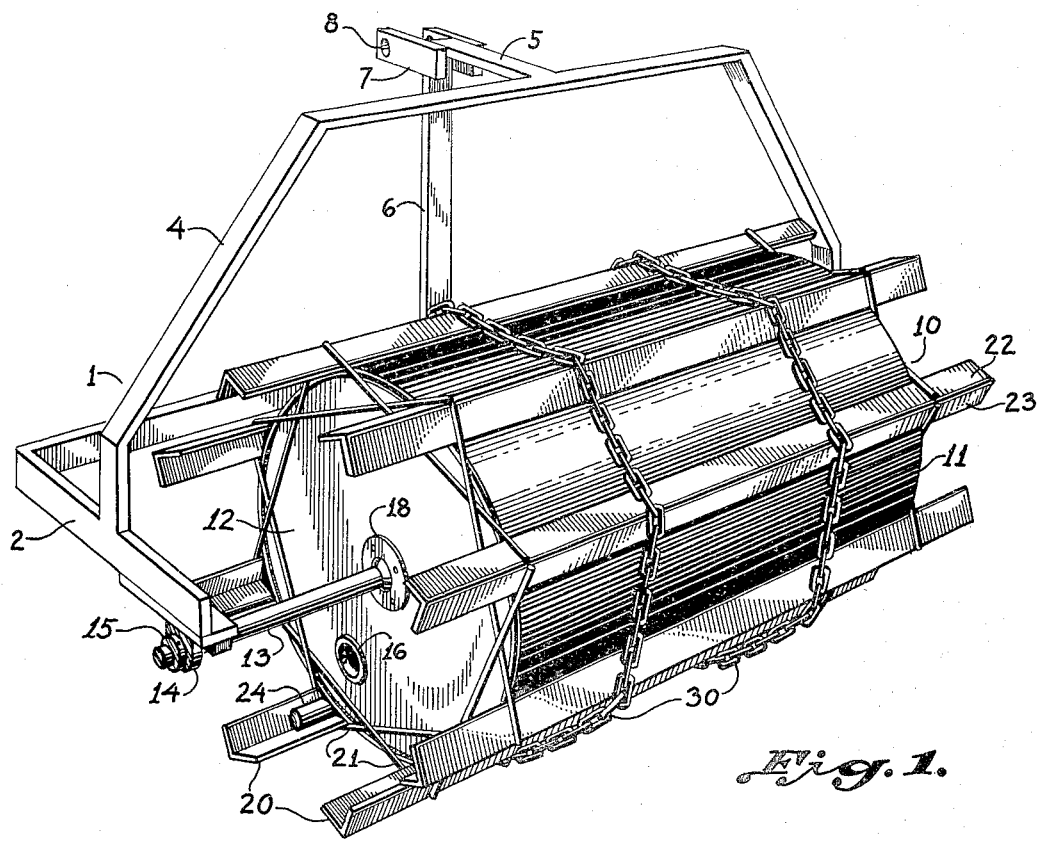
FIG. 1.

Referring to FIG. 1, the row marker of this invention generally comprises as its basic components a frame 1, a rotatably mounted support 10, transverse imprinting projections 20, and longitudinal imprinting projections 30.

Figure 2:
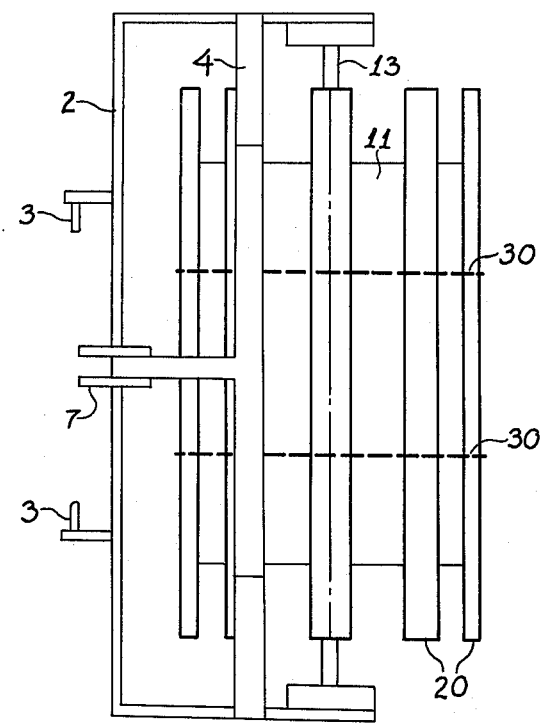
FIG. 2.
Figure 3:
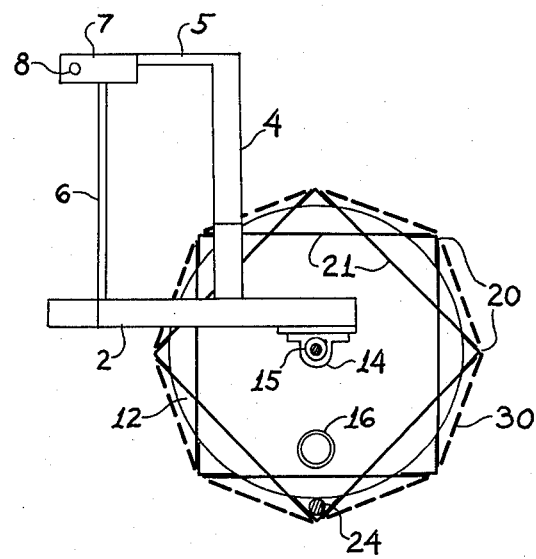
FIG. 3.

The frame 1 as best illustrated in FIGS. 2 and 3 is designed for attachment to a conventional category I three-point tractor hitch, but of course could be modified for other modes of attachment. Horizontal U-bar 2 of frame 1 is adapted for pivotal attachment to the tractor hitch lift arms (not shown) by hitch pins 3. Vertical U-bar 4 is integrally connected at its ends to U-bar 2, and the midpoints of the two bars are also interconnected by auxillary supports 5 and 6. The hitching bracket 7 at the junction of the auxillary supports is provided with hole 8 for pivotal attachment to the tractor top hitch bar of the three-point hitch system by a connecting pin (not shown).

Support 10 as depicted in FIGS. 1-3 is a drum having cylindrical surface 11 and ends 12. It is rotatably mounted on horizontal U-bar 2 by means of axle 13 and twin pillow block bearings 14. Restraining rings 15 inhibit lateral movement of the support within the frame. Flange collars 18 function to reinforce drum ends 12 where they are fixedly secured to the axle. One of the ends is provided with a closable opening 16.

The transverse imprinting projections 20 are elongated members rigidly attached to predetermined points on the periphery of the support by conventional means, supplemented with reinforcing rods 21 as necessary. These projections are V-shaped insofar as adjacent surfaces 22 and 23 meet at an angle in the range of about 45°–135°. They are oriented generally parallel to the axle 13 and the tips point radially outward from the surface of the support. One of the projections houses eccentric weight 24. When the row marker is raised off the ground, this weight operates to index the marker to a starting position for aligning the transverse projections with the imprints of a previous pass.

One or more longitudinal projections 30 extend around the circumference of the support and divide the transverse projections into a plurality of segments. These projections are characterized by a soil tractive surface having the dual function of marking the soil surface with continuous longitudinal impressions and providing positive traction for the row marker. Both the longitudinal projections and the transverse projections are of a suitable width that they impart readily discernible imprints in the earth.

Figure 4:
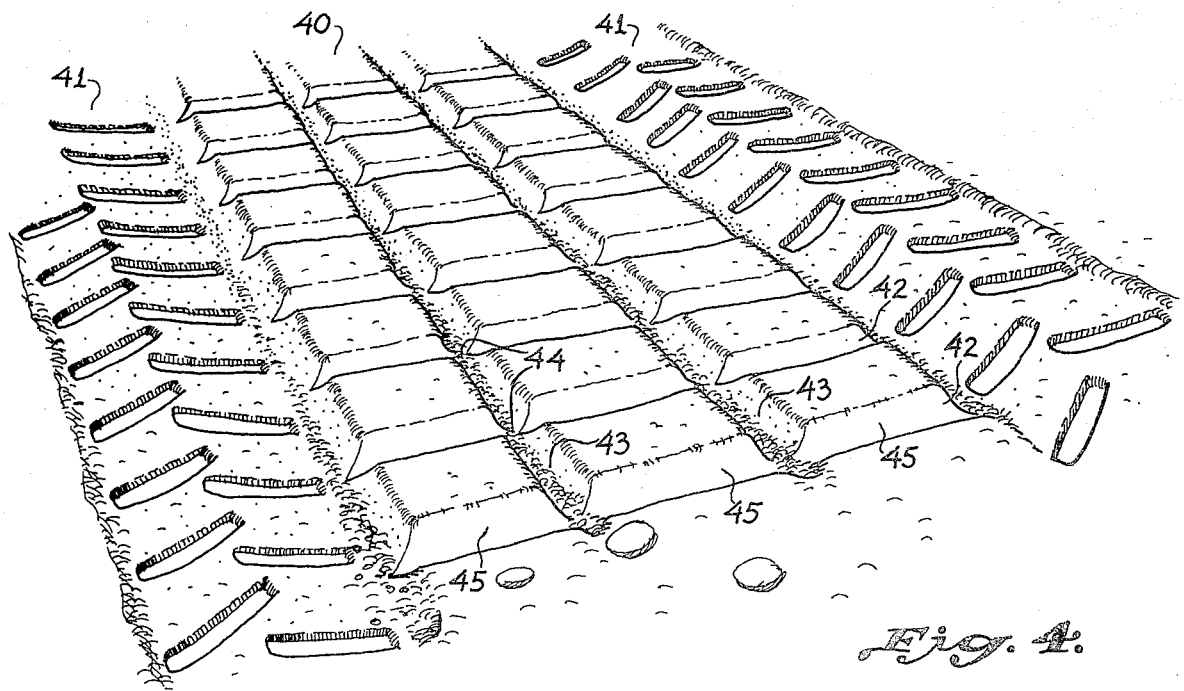
FIG. 4.

FIG. 4 illustrates the geometric pattern 40 produced in the soil by a pass with the row marker depicted in FIGS. 1–3. The tractor wheel imprints 41 define the borders of the range. Transverse impressions 42 across the width of the plot are those produced by transverse projections 20, and the longitudinal impressions 43 parallel to wheel marks 41 are from the longitudinal projections 30. In an ordinary test plot planting, the points of intersection 44 divide the transverse impressions 42 into a plurality of distinct seed rows 45, each of which may be planted with several seeds. The points of intersection 44 may alternatively be used for precisely defining predetermined locations for placement of seeds or seedlings, particularly for planting nursery stock. It is noted that the continuity in the lines of the grid pattern assists in clearly delineating the predetermined locations which could otherwise be obscured by irregularities in the soil surface or by carelessness in the planting of preceding rows. The depth of the impressions can be controlled by proper preselection of the height of the projections and by adjustment of the row marker weight. The weight may be increased by loading the frame or by filling the support drum with water through opening 16.

Certain variations may be made in the above design without altering the concept of the invention. For example the bearings could be mounted directly on the support 10 with the axle fixed to the frame. It would also be possible to substitute a skeletal framework for the drum. For most applications, the transverse projections are uniformly spaced around the periphery of the support and are divided into equal segments by the longitudinal projections. In an alternate embodiment, it is envisioned that by omitting or offsetting one of an otherwise uniformly spaced set of transverse projections, the row marker would have the additional capacity of linearly spacing groups of transverse rows along the line of travel.

The design of the above-described row marker lends itself to construction from readily available materials. For example, a conventional fluid storage barrel may be used as the support 20. The transverse projections may be cut from stock 90° angle iron and welded to the barrel. Sections of chain wrapped around the barrel and spot welded to the angle iron produce well-defined longitudinal lines and provide the row marker with the necessary positive traction.

It is understood that the foregoing detailed description is given merely by way of illustration and that modifications and variations not heretofore specified may be made therein without departing from the spirit and scope of the invention.

We claim:

1. A row marking apparatus adapted for simultaneously imprinting the earth with first lines transverse to the direction of travel of said apparatus and at least one second line substantially perpendicular to and transecting said first lines whereby said first lines and said at least one second line form a grid pattern in the earth, said apparatus comprising:
   (a) a frame;
   (b) support means rotatably mounted on said frame for rotation about the longitudinal axis of said support means;
   (c) first imprinting means mounted on said support means for imprinting said first lines;
   (d) second imprinting means mounted on said support means for imprinting said at least one second line, and
   (e) an eccentric weight for gravitationally returning said rotatably mounted support means to a predetermined position when said row marker is raised above the earth.

2. The apparatus as described in claim 1 wherein said first imprinting means comprises a plurality of outwardly pointing, V-shaped, elongated projections mounted on the outer periphery of said support means substantially parallel to and equidistant from said longitudinal axis.

3. The apparatus as described in claim 2 wherein said elongated projections are all uniformly spaced around the outer periphery of said support means.

4. The apparatus as described in claim 2 wherein said second imprinting means comprises at least one circumferential projection having a soil tractive surface and mounted on the outer periphery of said support means extending circumferentially around said support means.

5. The apparatus as described in claim 4 wherein said second imprinting means comprises a plurality of circumferential projections uniformly spaced along the length of said elongated projections.

6. The apparatus as described in claim 5 wherein said support is a cylindrical drum.

7. The apparatus as described in claim 2 wherein said eccentric weight is housed by one of said V-shaped, elongated projections.

* * * * *